Oct. 18, 1949.  A. B. POOLE  2,485,456
AUTOMATIC ELECTRIC TOASTER AND THE LIKE
Filed May 17, 1947  3 Sheets-Sheet 1
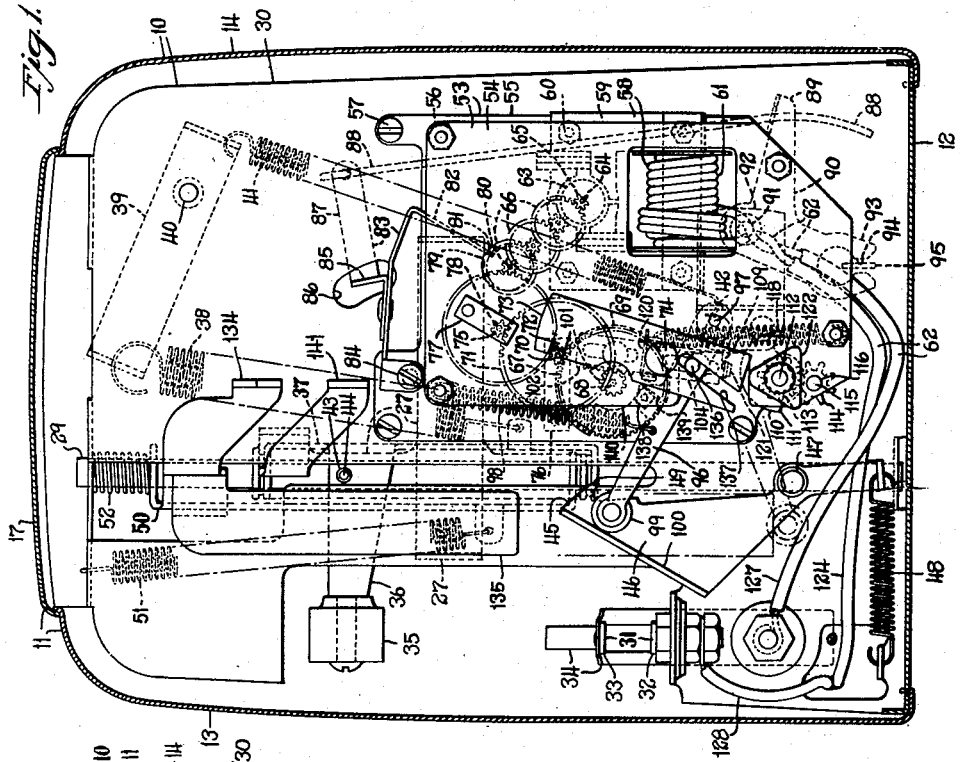
Inventor
Arthur B. Poole
by Seymour,
Carle & Nichols
Attorneys Oct. 18, 1949.  A. B. POOLE  2,485,456
AUTOMATIC ELECTRIC TOASTER AND THE LIKE
Filed May 17, 1947  3 Sheets-Sheet 2
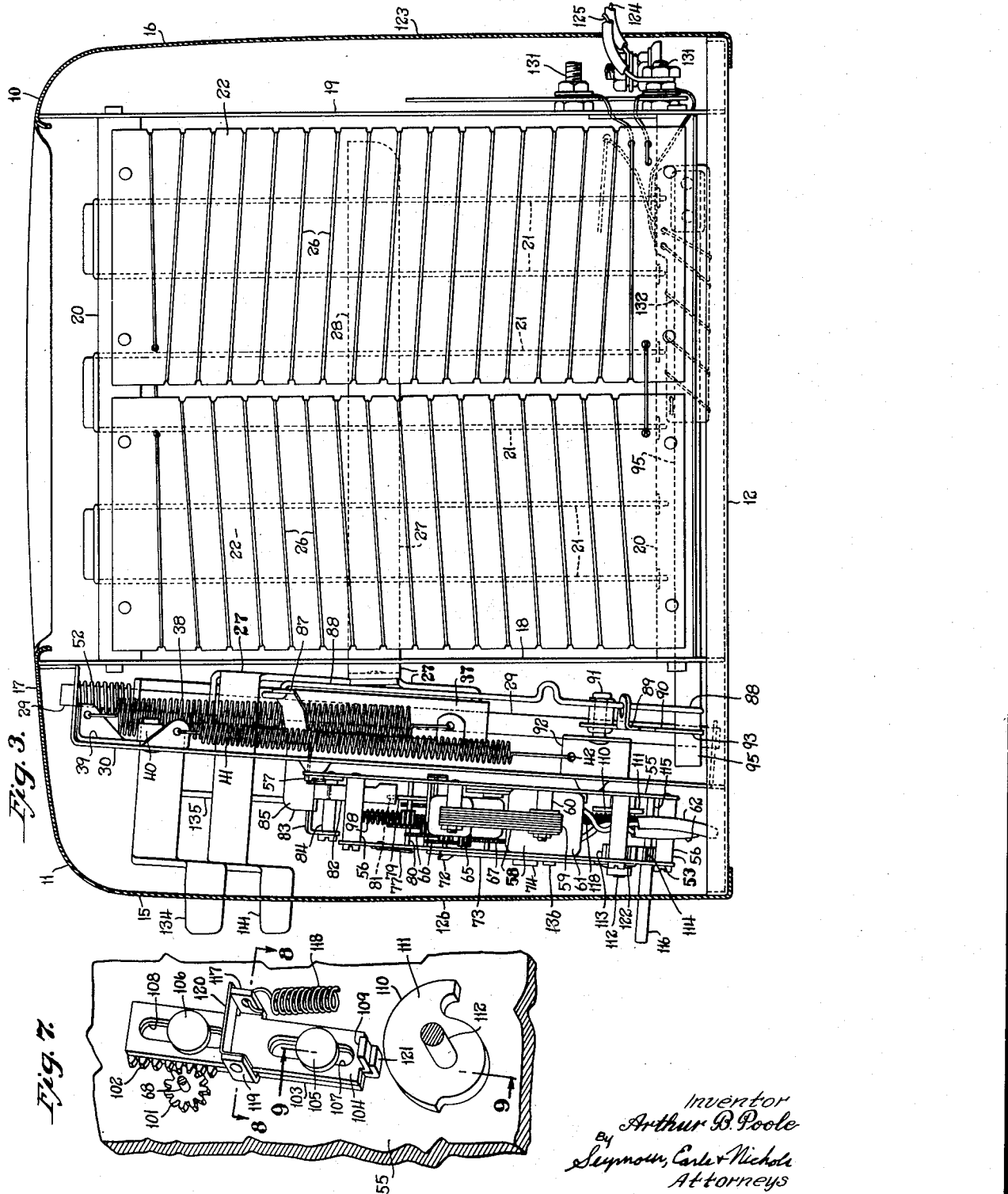
Inventor
Arthur B. Poole
By Seymour, Carle & Nichols
Attorneys Oct. 18, 1949.  A. B. POOLE  2,485,456
AUTOMATIC ELECTRIC TOASTER AND THE LIKE
Filed May 17, 1947  3 Sheets-Sheet 3

Inventor
Arthur B. Poole
By Seymour, Carter & Nichols
Attorneys

Patented Oct. 18, 1949

2,485,456

UNITED STATES PATENT OFFICE 2,485,456

AUTOMATIC ELECTRIC TOASTER AND THE LIKE

Arthur B. Poole, Harwinton, Conn.

Application May 17, 1947, Serial No. 748,761

5 Claims. (Cl. 99—333)

1

The present invention relates to improvements in automatic electrically-heated toasters and the like.

This application is a continuation-in-part of my application Serial No. 531,148 filed April 15, 1944.

One object of this invention is to provide an improved automatic toaster having an electric timing-motor so rugged that it will withstand an unusual amount of electrical and mechanical abuse.

Another object of this invention is to provide an improved automatic toaster in which all wire that is used in the construction of the electric motor is so coarse that it can be insulated effectively to withstand the high temperature encountered within the casing of the toaster without damage from overheating.

Another object of this invention is to provide an improved automatic toaster in which the only external current supply to the motor passes only through the energizing-coil of the motor, and in which the voltage across the terminals of this coil is so low that the motor can be drenched with water by washing, without causing short circuiting.

Another object of this invention is to provide an improved thermostat-controlled brake-means for the motor.

Another object of this invention is to provide improved timing adjusting-means which will remain in proper adjustment.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which one way of carrying out the invention is shown for illustrative purposes:

Fig. 1 is an end elevation of a toaster made in accordance with the present invention, with the casing in section;

Fig. 2 is a broken view similar to Fig. 1 but with the front movement-plate omitted and with the operating parts in a different position;

Fig. 3 is a right side elevation of Fig. 1 with the casing in section;

Fig. 4 is a sectional view through the motor stator-coil on line 4—4 of Fig. 2;

2

Figure 5:
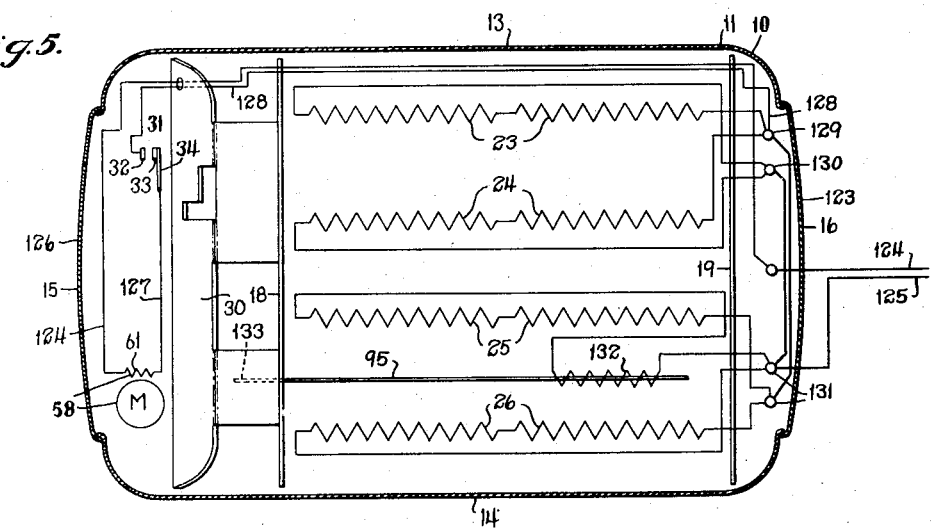
Figure 6:
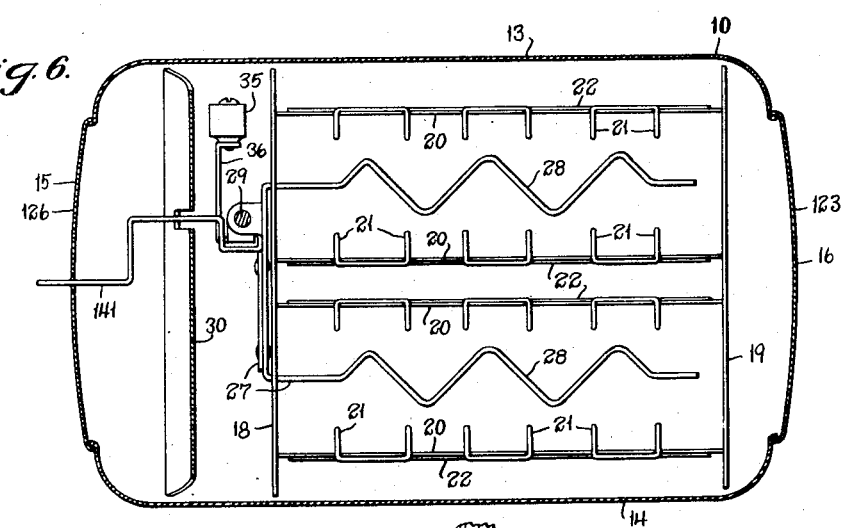
Figure 8:
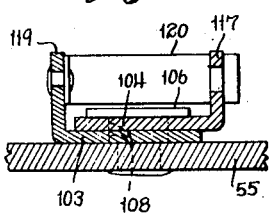

Fig. 5 is a top plan view of the toaster with the casing in section and schematically illustrating the heating-elements and the motor and their electrical connections;

Fig. 6 is a top plan view of the toaster similar to Fig. 5, and omitting certain of the parts for clearness;

Fig. 7 is a perspective view illustrating part of the time-adjusting means;

Fig. 8 is a sectional view on line 8—8 of Fig. 7; and

Figure 9:
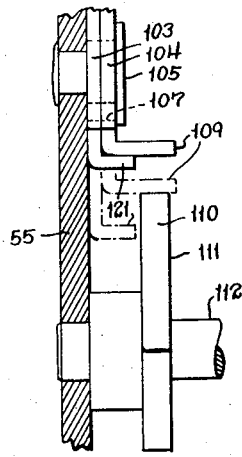

Fig. 9 is a sectional view on line 9—9 of Fig. 7.

Referring to the drawings showing the particular form of the invention chosen for illustration therein, the toaster 10 includes a casing 11 having a base or base-plate 12, side portions 13 and 14, front and rear portions 15 and 16, and top portion 17. In the particular construction illustrated, the front, rear and top portions 15, 16 and 17 are integral. Upstanding front and rear support-plates 18 and 19 are secured to the base 12. Four upper and four lower horizontal bar-supports 20 extend between and interconnect the support-plates 18 and 19. Three vertical double-wire guides 21 extend from each upper horizontal bar-support 20 to a corresponding lower horizontal bar-support 20 for the purpose of giving side support to the bread to be toasted. A pair of mica plates 22 extends from each upper horizontal bar-support 20 to a corresponding lower horizontal bar-support 20, for the purpose of supporting resistance-wire food-heating elements 23, 24, 25 and 26.

A toast-support slide 27 has a pair of bread- or toast-supports 28 for supporting the lower edges of the bread to be toasted. The toast-support slide 27 is mounted to slide up and down upon a vertical slide-support rod 29 which is secured to upper and lower portions of a mechanism support-plate 30 which is connected to the base 12 and the front support-plate 18.

An electric switch 31 includes a fixed contact 32 and a movable contact 33 carried by a resilient or spring conductor-arm 34 which normally holds the movable contact spaced up away from the fixed contact in open-circuit position. A switch-closer roller 35 of insulation is mounted on an arm 36 of a switch-closing slide 37 which is slidably mounted upon the rod 29. A spring 38 has its lower end connected to the switch-closing slide 37 and its upper end connected to one end of an arm 39 which is pivoted at 40 on the rear of the supporting-plate 30, and has its other end connected to the upper end of a spring 41 whose lower end is secured to the plate 30 at 42. Thus, the two springs 38 and 41 normally tend to move the switch-closing slide 37 up to open-circuit position. When the switch-closing slide 37 is pushed down to its limit of movement against the action of the springs 38 and 41, the roller 35 pushes the spring-arm 34 down to close the contacts 32 and 33, and a roller 43 on a pin 44 secured to the slide 37, engages the cam face 45 of a latch-plate 46 and swings the latch-plate about its pivot 47 against the action of a spring 48 until the roller 43 passes beneath and is engaged by the keeper 49 by the action of the spring 48.

A reset-slide 50 is normally held in its uppermost position by means of a spring 51 which has its upper end secured to the support-plate 30. A spring 52 on the rod 29 serves to cushion the shock of the slides at the end of their upward movement on the rod 29.

The toast-holding slide 27 is located between the two slides 37 and 50, and is not moved in either direction by any spring connected to it, but is pushed downward by the reset-slide 50, and is pushed upward by the switch-closing slide 37. Therefore, when the mechanism is held down in closed-circuit position by the keeper 49, the toast-holding slide is free to be moved upward by lifting its hand-arm 141 to thus permit of inspecting any bread being toasted, as is well known to those skilled in the art.

An interval timer 53 includes front and back movement-plates 54 and 55 held in rigid spaced-apart relation by means of four pillars 56. The rear movement-plate 55 is secured to the mechanism support-plate 30 by the three screws 57. An alternating-current self-starting synchronous electric motor 58 has a field or stator structure 59 which is secured to the rear movement-plate 55 by means of four pillars 60. The stator-coil 61 receives electric power from an outside electric power supply through the terminal-leads 62, the particular electrical connections of which will be hereinafter more fully described. The rotor 63 of the motor has its rotor-shaft 64 rotatably mounted in the movement-plates 54 and 55. A gear 65 rigidly secured on the rotor-shaft 64 forms part of a speed-reducing gear-train 66 extending to and including the final gear 67 which is rigidly secured to and drives the cam-shaft 68 which has a cam 69 also rigidly secured thereto.

A clutch-shaft 70 has the clutch-gear 71 of the gear-train 66 rigidly secured to the shaft and is adapted to be slid longitudinally of itself by a cam-lug 72 of a clutch-lever 73 pivoted at 74 on the front movement-plate 54 to shift the gear 71 out of engagement with its driving-pinion 75, and is adapted to be shifted back into such driving relation by a flat spring 76 which has one end secured on the rear face of the rear movement-plate 55, with its other end normally yieldingly pressing the shaft 70 toward clutching position. Another flat spring 77 secured on the front of the front movement-plate 54 permits the shaft 78 to yieldingly slide longitudinally in the direction of the front movement-plate 54 if the clutch-gear 71 on being moved in the direction of the front movement-plate 54 by the spring 76 does not properly mesh with the pinion 75 and pushes against the end of the pinion 75, until rotation of the pinion 75 by the motor results in proper meshing position of the teeth of the gears 75 and 71, whereupon the spring 77 pushes the shaft 78 and its pinion 75 toward the rear movement-plate 55 to thereupon mesh the gears 75 and 71.

A cam-shaped locking-disk 79 is rigidly secured onto the shaft 80 of the gear-train, and has a locking-abutment face 81 adapted to be lockingly engaged by a locking-abutment or -member 82 of a thermo-actuated member 83 pivoted at 84 on the rear movement-plate 55. An arm 85 is rigidly secured to the member 83 and extends through a slot 86 in the supporting-plate 30 and has an arm 87 which is loosely pivoted to a wire rod 88, the lower end of which extends through a hole in an arm 89 of a bell-crank lever 90 pivotally mounted at 91 on a bracket 92 secured to the rear of the supporting-plate 30. The other arm 93 of the bell-crank lever 90 has a slot 94 in which is engaged the end-portion of a bimetallic thermal operating-bar 95.

A latch-release lever 96 is pivoted at 97 in the front and rear movement-plates 54 and 55 and is normally pulled toward the upper limit of its movement by a spring 98 connected to the upper left pillar 56. When the lever 96 is thus pulled upward, the roller 99 rotatably mounted on the outer free end of the lever 96 rides along the cam face 100 of the latch 46 and swings the latch about its pivot to unlatching position to release the roller 43.

The cam-shaft 68 in addition to containing the last gear 67 of the speed-reducing gear-train 66 and the cam 69, also has a pinion 101 secured to it, which pinion 101 meshes with a rack 102 of a slide-bar 103 (Fig. 7) beneath a similar slide-bar 104 which contains no rack-teeth. The two slide-bars 103 and 104 are slidably mounted for sliding movement up and down on the inner face of the rear movement-plate 55 by means of the studs 105 and 106 which extend through slots 107 and 108 in the slide-bars 103 and 104. The slide-bar 104 has a limit-finger 109 extending out from its lower end and of a length sufficient to engage against the top cam edge surface 110 of an adjusting-cam 111 mounted by means of a shaft 112 in the front and rear movement-plates. The adjusting-cam 111 can be adjusted by means of the gear 113 secured on the shaft 112 and meshing with a gear 114 secured on a shaft 115, the shafts 112 and 115 being pivotally mounted in the front and rear movement-plates, with the shaft 115 being provided with a finger-grip extension 116 which may be rotated in one direction or the other to correspondingly rotate the adjusting-cam 111. The slide-bar 104 has a lug 117 to which a coil-spring 118 has its upper end secured, which spring has its lower end secured to the lower pillar 56 and thus normally pulls the slide-bar 104 down with its limit-finger 109 engaged against the cam edge 110 of the cam 111. The slide-bar 103 has a lug 119 to which is riveted a leaf-spring 120 which presses down on the top of the lug 117 of the top slide-bar 104. The leaf-spring 120 tends to slide the slide-bar 103 upward relative to the slide-bar 104 until the limit-finger 121 of the slide-bar 103 engages the under face of the limit-finger 109 of the slide-bar 104. The finger 121 of the slide-bar 103 is sufficiently short so that, as shown in Fig. 9, it will not under any circumstances engage the cam 111. A spring-friction washer 122 on the shaft 112 serves to frictionally hold the shaft 112 and its cam 111 in any desired adjusted position. Instead of employing the timing device hereinbefore described, a different type of timing device may be employed as, for example, the type disclosed in my Patent No. 2,359,580 granted October 3, 1944.

Alternating electric current enters the rear end 123 of the toaster (see Fig. 5) through an electric cord containing the two wires 124 and 125. The circuit from the wire 124 extends to the front end 126 of the toaster and connects with one end of the stator-coil 61 of the electric motor 58, then extends along the wire 127 to the switch 31 then back through the wire 128 to the binding-post 129 from where the current passes through the four resistance food-heating elements 23, 24, 25 and 26, then back to the binding-posts 130 and 131 from where the current travels through the wire 125 except that an electric heating-coil 132 is wound around the bimetallic strip or thermal-element 95 and is interposed between the heating-element 24 and the binding-post 131 in order to add an additional amount of heat to that which reaches the thermal-element 95 as a result of its location within the toaster. The effect of the bimetallic thermal-element 95 being heated causes its free end 133 to be swung to the right (Fig. 1) to actuate the parts as previously described to lift the end of the locking-member 82 out of engagement with the locking-abutment 81 of the locking-disk 79 to thus permit the electric motor 58 to drive the mechanism in a way that will be more fully hereinafter explained. The only current that passes through the electric motor 58, passes through the stator-coil 61 thereof and it will be observed that all current that passes through the stator-coil 61 also passes through all four of the heating-elements 23, 24, 25 and 26, which heating-elements are themselves connected in parallelism with one another.

Operation

Assuming the wires 124 and 125 to be connected to the source of electric power with the parts in the inoperative position illustrated in Fig. 1, if now the hand-arm 134 of the reset-slide 50 is pushed downward to the limit of its movement, the reset-arm 135 carried by the reset-slide 50 presses against the roller 99 of the latch-release lever 96 and swings the lever about its pivot 97 to its lowermost position indicated in broken outline in Fig. 1, causing the pin 136 of the lever 96 to ride along the cam-slot 137 of the clutch-lever 73 and cause the clutch-lever to swing about its pivot 74 to thereby cause the cam-lug 72 to press against the end of the clutch-shaft 70 and push it endwise toward the rear movement-plate and thereby carry the clutch-gear 71 out of mesh with its drive-pinion 75 to thus free the shaft 68 and its cam 69 which is now in unbalanced position, thus permitting the unbalanced weight of the cam 69 to rotate the shaft 68 with its pinion 101, which latter meshes with the rack 102 thereby moving the slide-bars 103 and 104 downward until the limit-finger 109 of the bar 104 strikes against the edge 110 of the adjusting-cam 111, whereupon the limit-finger 121 of the bar 103 rides further down to a lowermost position as illustrated in broken outline in Fig. 9, against the action of the leaf-spring 120, which latter reacts against the other slide-bar 104 to thereby bring the limit-finger 121 back up again against the underneath surface of the limit-finger 109. This movement of the limit-finger 121 downwardly away from the limit-finger 109 acts both against the leaf-spring 120 and the friction between the two slides to thus permit the cam 69 to rotate somewhat beyond its proper reset position. But the leaf-spring acting between the two slides and through the pinion and rack moves the cam back to its proper reset position when the two limit-fingers are engaged against one another with the limit-finger 109 engaged against the top edge of the adjusting-cam 111. This action of permitting one of the slides to move yieldingly downwardly while the other one remains still, and being gradually brought back to its proper position and thus to bring the cam 69 back to its proper position, avoids any sudden shock or bouncing against the adjusting-cam 111 and thus minimizes the tendency of such shock to gradually shift the adjusting-cam 111 out of its desired adjusted position where the toaster is being operated for many times with the adjusting-cam occupying a single pre-set position. This construction also permits adjustment of the adjusting-cam while the motor is running, merely by rotating the adjusting-cam to the desired adjusted position.

After the cam 69 thus swings to its proper reset position and the lever 96 is released, the lever 96 is swung upwardly about its pivot 97 by the coil-spring 98 until the lug 138 engages against the edge of the cam 69, as shown in Fig. 2. This partial swinging up of the lever 96 has again caused re-clutching of the gears 71 and 75 so that the gear-train is now ready to drive the cam-shaft 68 and its cam 69, when the electric motor starts.

At the same time that this resetting operation takes place, the reset-slide 50 pushes the toast-holder slide 27 down against the switch-closing slide 37 and causes the roller 35 of the latter to close the switch 31 and to cause the roller 43 on the pin 44 to be engaged beneath the keeper 49 of the latch-plate which is urged to latching position by the spring 48, thus holding the switch 31 closed.

Electric current now passes through the food-heating elements 23, 24, 25 and 26, and through the heating-coil 132 on the bimetallic bar 95 and through the stator-coil 61 of the electric motor 58. But the motor and its gear-train is held from rotation until the toaster gets hot by the locking-member 82 being in locking engagement with the abutment-face 81 of the locking-disk 79, until the bimetallic thermal-element 95 moves the locking-member 82 to released position, whereupon the electric motor starts driving the timing-cam or -disk 69 through the speed-reducing gear-train until the notched portion 139 of the cam 69 comes opposite the lug 138 of the latch-release lever 96, whereupon the spring 98 swings the lever up until the lug 138 engages the bottom 140 of the notch 139, as shown in Fig. 1. This upward movement of the lever 96 causes its roller 99 to release the latch-keeper 49 from the roller 43 to thus permit the switch-slide 37 to be pulled upwardly by its springs to open the switch 31 and thus shut off all electric current passing through the toaster.

By providing an electric toaster or the like with an electric timing-motor having its stator-coil in series with resistance food-heating means, the stator-coil can be made of a few turns of coarse copper wire instead of the thousands of feet of very fine wire which would be necessary if the stator-coil were to take the full 115 volts of the electric current, thus providing a timing-motor that is so rugged that it will withstand an unusual amount of electrical and mechanical abuse. Wire as coarse as No. 13 B & S gauge wire can be employed, although applicant prefers to use No. 14 wire to form a coil having about eighteen turns of a length of about fifty-seven inches. This stator-coil of No. 14 wire has a voltage drop across its terminals of only 0.5 volt. With this coarse wire, the bulk of any insulation is so small compared to the bulk of the copper of the wire, that it is easy to provide insulation that will withstand any desired temperature of operation.

Double Formvar insulation has proved to be satisfactory. And owing to the small fraction-of-a-volt voltage-drop between any two adjacent turns of the coil, the coil can be drenched with water by washing without causing short circuiting.

The insulation-bulk problem and the slowness of travel of heat out from the center of a fine-wire coil of a 115-volt motor, makes it impossible or impractical to successfully employ a fine-wire 115-volt motor located within the casing of an automatic electric toaster where the temperature rises to about 400° F., whereas applicant's improved motor and food-heating resistance combination, for the first time provides a successful automatic electric toaster employing an electric timing-motor which will successfully operate indefinitely within the high-temperature enclosure or casing of the toaster. Applicant's improved motor not only is at least as low in cost as the previous commercially used spring-motors, but also provides constant speed and therefore uniform timing under all temperature ranges. Moreover, in the case of a spring-motor, it is necessary to employ a self-starting balance wheel which necessarily is of inferior timekeeping reliability. Also, the escapement mechanism is necessarily very delicate and readily subject to damage by dropping and otherwise.

In order that the electric motor shall have the valuable and rugged characteristics hereinbefore set forth, it is important that the resistance of the stator-coil shall be less than one-twentieth, and preferably even much less than that, of the resistance of the resistance food-heating means.

A toaster constructed as shown in the drawings and consuming about 1150 watts operates successfully at from 110 to 120 volts, and therefore the addition of applicant's improved motor in series with the food-heating elements of the toaster, does not substantially change the operating characteristics of the circuit, since the motor only requires 0.5 volt.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An electrically-heated and electrically-timed automatic toaster or the like including: food-holding means; resistance food-heating means located adjacent said food-holding means; a rotary alternating-current self-starting synchronous electric timing-motor having a rotor not connected to any external current supply, and having a stator energizing-coil connected in series with said resistance food-heating means, the resistance of said stator energizing-coil being less than one-twentieth of the resistance of said resistance food-heating means; electric switch-means controlling the current supply through said resistance food-heating means and said stator energizing-coil; switch-actuating means constructed and arranged to cause said switch-means to be actuated to open-circuit position; a speed-reducing gear-train for said rotor, and interconnecting said rotor and said switch-actuating means to cause said rotor to control the actuation of said switch-actuating means; and adjusting-mechanism associated with said gear-train and constructed and arranged to be adjusted to any of a plurality of adjustments to cause said rotor to make a predetermined amount of rotation corresponding to any given adjustment of said adjusting-mechanism before said switch-actuating means is actuated.

2. An electrically-heated and electrically-timed automatic toaster or the like including: food-holding means; resistance food-heating elements connected in parallel with each other, and located adjacent said food-holding means; a rotary alternating-current self-starting synchronous electric timing-motor having a rotor not connected to any external current supply, and having a stator energizing-coil connected in series with said resistance food-heating elements, the resistance of said stator energizing-coil being less than one-twentieth of the combined resistance of said resistance food-heating elements; electric switch-means controlling the current supply through said resistance food-heating elements and said stator energizing-coil; switch-actuating means constructed and arranged to cause said switch-means to be actuated to open-circuit position; a speed-reducing gear-train for said rotor, and interconnecting said rotor and said switch-actuating means to cause said rotor to control the actuation of said switch-actuating means; and adjusting-mechanism associated with said gear-train and constructed and arranged to be adjusted to any of a plurality of adjustments to cause said rotor to make a predetermined amount of rotation corresponding to any given adjustment of said adjusting-mechanism before said switch-actuating means is actuated.

3. An electrically-heated and electrically-timed automatic toaster or the like including: food-holding means; resistance food-heating means located adjacent said food-holding means; a rotary alternating-current self-starting synchronous electric timing-motor having a rotor not connected to any external current supply, and having a stator energizing-coil connected in series with said resistance food-heating means, the resistance of said stator energizing-coil being less than one-twentieth of the resistance of said resistance food-heating means; electric switch-means controlling the current supply through said resistance food-heating means and said stator energizing-coil; switch-actuating means constructed and arranged to cause said switch-means to be actuated to open-circuit position; a speed-reducing gear-train for said rotor, and interconnecting said rotor and said switch-actuating means to cause said rotor to control the actuation of said switch-actuating means; and adjusting mechanism associated with said gear-train and constructed and arranged to be adjusted to any of a plurality of adjustments to cause said rotor to make a predetermined amount of rotation corresponding to any given adjustment of said adjusting-mechanism before said switch-actuating means is actuated; said adjusting-mechanism including an adjusting-cam, and two adjusting-members movable in opposite directions relatively to one another and movable in opposite directions relatively to said adjusting-cam, and limit-means adapted to limit the said relative movement in one direction between said adjusting-members, and yieldable means adapted to yieldably urge said adjusting-members to the position limited by said limit-means, and other limit-means carried by one of said adjusting-members and adapted to engage said adjusting-cam, and other yieldable means yieldably urging said other limit-means toward said adjusting-cam.

4. An electrically-heated and electrically-timed automatic toaster or the like including: food-holding means; resistance food-heating means located adjacent said food-holding means; a rotary alternating-current self-starting synchronous electric timing-motor having a rotor not connected to any external current supply, and having a stator energizing-coil connected in series with said resistance food-heating means, the resistance of said stator energizing-coil being less than one-twentieth of the resistance of said resistance food-heating means; electric switch-means controlling the current supply through said resistance food-heating means and said stator energizing-coil; switch-actuating means constructed and arranged to cause said switch-means to be actuated to open-circuit position; a speed-reducing gear-train for said rotor, and interconnecting said rotor and said switch-actuating means to cause said rotor to control the actuation of said switch-actuating means; adjusting-mechanism associated with said gear-train and constructed and arranged to be adjusted to any of a plurality of adjustments to cause said rotor to make a predetermined amount of rotation corresponding to any given adjustment of said adjusting-mechanism before said switch-actuating means is actuated; and locking-means associated with said gear-train and adapted to lock said gear-train and rotor against rotation, and heat-actuated operating-means constructed and arranged when its temperature passes below a certain temperature to actuate said locking-means to locking position and when its temperature passes above a certain temperature to actuate said locking-means to unlocking position.

5. An electrically-heated and electrically-timed atomatic toaster or the like including: food-holding means; resistance food-heating means located adjacent said food-holding means; a rotary alternating-current self-starting synchronous electric timing-motor having a rotor not connected to any external current supply, and having a stator; electric switch-means; a pair of electric supply-terminals; a lead-wire connecting one of said supply-terminals to said switch-means; said lead-wire being coiled intermediate said one supply-terminal and said switch-means to form a plurality of turns around said stator to form an energizing-coil for said stator; said stator energizing-coil being connected in series with said resistance food-heating means to said supply-terminals, and the resistance of said stator energizing-coil being less than one-twentieth of the resistance of said resistance food-heating means; said electric switch-means controlling the current supply through said resistance food-heating means and said stator energizing-coil; switch-actuating means constructed and arranged to cause said switch-means to be actuated to open-circuit position; a speed-reducing gear-train for said rotor, and interconnecting said rotor and said switch-actuating means to cause said rotor to control the actuation of said switch-actuating means; and adjusting-mechanism associated with said gear-train and constructed and arranged to be adjusted to any of a plurality of adjustments to cause said rotor to make a predetermined amount of rotation corresponding to any given adjustment of said adjusting-mechanism before said switch-actuating means is actuated.

ARTHUR B. POOLE.

REFERENCES CITED

The following references are of record in the file of this patent:

UNITED STATES PATENTS

| Number | Name | Date |
|---|---|---|
| 1,738,328 | Spielman | Dec. 3, 1929 |
| 1,967,209 | Lawrence | July 17, 1934 |
| 2,182,124 | Guerra | Dec. 5, 1939 |
| 2,194,859 | Malmquist et al. | Mar. 26, 1940 |
| 2,307,347 | Anderson | Jan. 5, 1943 |
| 2,347,385 | Wright et al. | Apr. 25, 1944 |
| 2,364,184 | Baak | Dec. 5, 1944 |